United States Patent
Okubo et al.

(10) Patent No.: US 8,700,849 B2
(45) Date of Patent: Apr. 15, 2014

(54) STORAGE DEVICE HAVING CAPABILITY TO TRANSMIT STORED DATA TO AN EXTERNAL APPARATUS AND RECEIVE DATA FOR STORAGE FROM THE EXTERNAL APPARATUS BASED ON AN INSTRUCTION FROM A HOST APPARATUS, AND DATA COMMUNICATION SYSTEM USING THE SAME

(75) Inventors: Hideaki Okubo, Saitama (JP); Takumi Okaue, Kanagawa (JP); Jun Tashiro, Kanagawa (JP); Takeshi Ishimoto, Kanagawa (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 12/901,863

(22) Filed: Oct. 11, 2010

(65) Prior Publication Data

US 2011/0093657 A1 Apr. 21, 2011

(30) Foreign Application Priority Data

Oct. 19, 2009 (JP) ................................. 2009-239949

(51) Int. Cl.
*G06F 12/00* (2006.01)
(52) U.S. Cl.
USPC .................... 711/115; 711/154; 711/E12.001
(58) Field of Classification Search
USPC .................... 711/115, 154, E12.001
See application file for complete search history.

(56) References Cited

U.S. PATENT DOCUMENTS

| | | | | |
|---|---|---|---|---|
| 3,790,961 A | * | 2/1974 | Palfi et al. | 365/189.03 |
| 4,524,417 A | * | 6/1985 | Kimoto | 710/58 |
| 5,225,667 A | * | 7/1993 | Furuta et al. | 235/492 |
| 6,075,723 A | | 6/2000 | Naiki et al. | |
| 6,195,296 B1 | * | 2/2001 | Cheol | 365/189.05 |
| 6,802,453 B1 | * | 10/2004 | Okaue et al. | 235/492 |
| 7,259,679 B2 | * | 8/2007 | Yoshida et al. | 340/572.8 |
| 7,617,356 B2 | * | 11/2009 | Bains | 711/106 |
| 2005/0253726 A1 | * | 11/2005 | Yoshida et al. | 340/572.8 |
| 2007/0153320 A1 | * | 7/2007 | Yamaoka | 358/1.15 |

FOREIGN PATENT DOCUMENTS

| | | | |
|---|---|---|---|
| EP | 1 102 454 A1 | | 5/2001 |
| EP | 1 619 609 A2 | | 1/2006 |
| JP | 59177667 A | * | 10/1984 |
| JP | 11-176178 | | 7/1999 |
| JP | 2009025907 A | * | 2/2009 |
| WO | 2005/062248 A1 | | 7/2005 |

OTHER PUBLICATIONS

European Search Report dated Nov. 11, 2011 in connection with counterpart EP Application No. EP 10 01 3425.

* cited by examiner

*Primary Examiner* — Mardochee Chery
(74) *Attorney, Agent, or Firm* — Dentons US LLP

(57) ABSTRACT

A storage device includes: an input/output section connected to an electronic apparatus; a memory for storing data; a control section accessing the memory based on an instruction input from the electronic apparatus to the input/output section; and a communication section communicating with an external apparatus separate from the electronic apparatus, wherein the control section accesses a range in the memory specified by the electronic apparatus based on the instruction from the electronic apparatus and causes data associated with the accessed range to be transmitted and received between the communication section and the external apparatus.

14 Claims, 10 Drawing Sheets

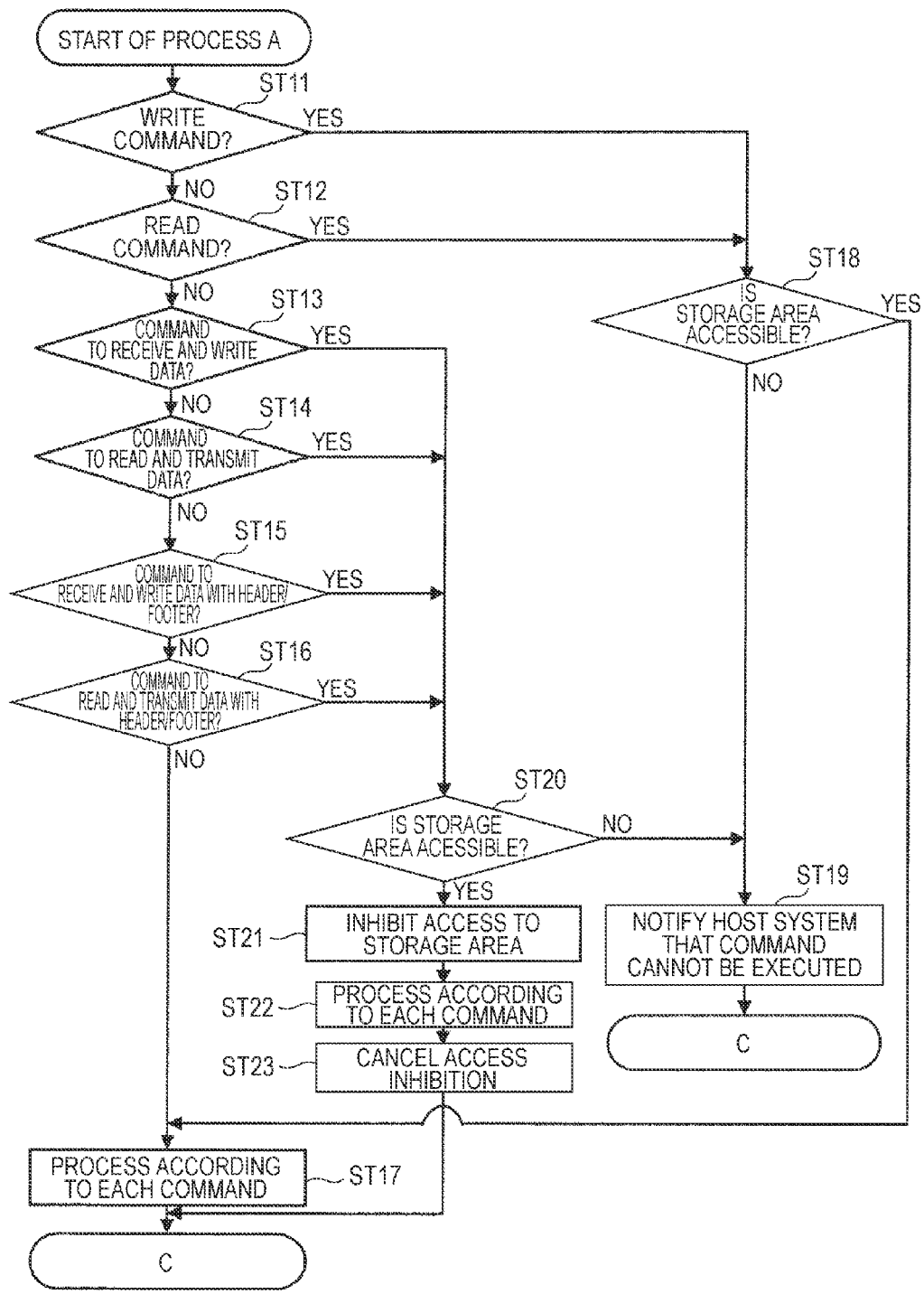

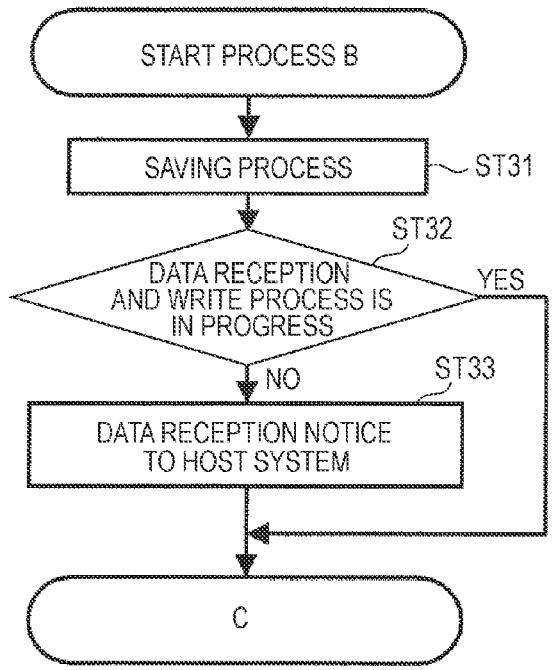
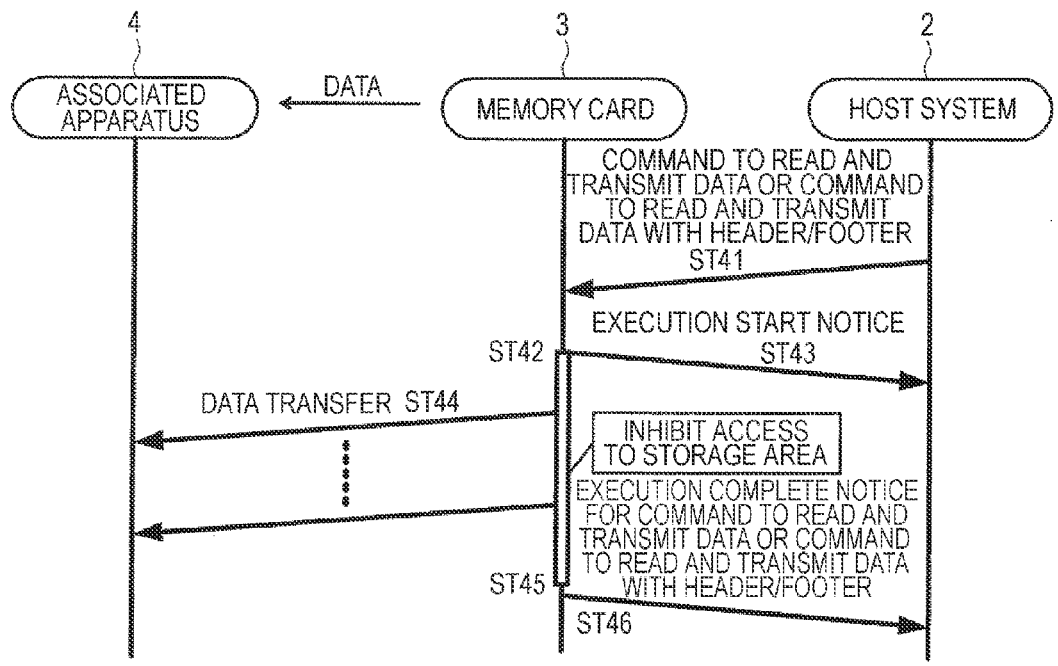

STORAGE DEVICE HAVING CAPABILITY TO TRANSMIT STORED DATA TO AN EXTERNAL APPARATUS AND RECEIVE DATA FOR STORAGE FROM THE EXTERNAL APPARATUS BASED ON AN INSTRUCTION FROM A HOST APPARATUS, AND DATA COMMUNICATION SYSTEM USING THE SAME

BACKGROUND OF THE INVENTION

1. Field of the Invention

The present invention relates to a storage device capable of data transfer to and from an external apparatus, and the invention relates to a data communication system.

2. Description of the Related Art

A host apparatus and an IC memory card are disclosed in JP-A-11-176178 (Patent Document 1). The IC memory card is connected to the host apparatus. The host apparatus accesses the IC memory card connected to the same to write data in the IC memory card. The host apparatus also reads data from the IC memory card.

SUMMARY OF THE INVENTION

Some electronic apparatus such as portable game machines and digital cameras have the function of communicating with an external apparatus, i.e., another portable game machine, another digital camera, or a server apparatus on a network.

Electronic apparatus capable of communication with an external apparatus have a communication section utilizing a wired LAN, a wireless LAN, Bluetooth (registered trademark), or the like.

Electronic apparatus such as portable game machines and digital cameras employ a memory card in addition to a memory incorporated in the apparatus.

A memory card is removably inserted in an electronic apparatus to save user data, photographic data, and the like in the card.

Data saved in such an electronic apparatus using a memory card may be transmitted from the apparatus to an external apparatus to save the data in the external apparatus.

When the data is transferred from the memory card to the external apparatus using the communication section of the electronic apparatus, a problem as described below may arise.

When data is transmitted from the memory card to the external apparatus, the data in the memory card is read into the electronic apparatus and is thereafter transmitted from the electronic apparatus to the external apparatus.

Thus, the data in the memory card is temporarily saved in a RAM or the like provided in the electronic apparatus and is thereafter transmitted from the RAM of the electronic apparatus to the external apparatus. The data in the memory card is once transmitted from the memory card to the electronic apparatus and is further transmitted from the electronic apparatus to the external apparatus.

As thus described, when data is transferred between the memory card and the external apparatus using the communication section of the electronic apparatus, one data transfer involves two communication processes, i.e., a communication process performed between the memory card and the electronic apparatus and another communication process performed between the electronic apparatus and the external apparatus.

The second communication process must be started after the data is transferred by the first communication process.

Further, two transmission processes take place each time data is transferred.

As a result, the rate of data transfer between the memory card and the external apparatus cannot exceed a predetermined value, and data transfer rates anticipated to be achievable during communication according to various communication standards cannot be reached.

Therefore, even if the communication section is adapted to a high data transfer rate, the data transfer rate cannot be sufficiently achieved.

Data transmission between the electronic apparatus having a memory card therein and the external apparatus is carried out according to a communication protocol with which both of the apparatus comply.

Thus, the electronic apparatus must add, for example, header data or footer data as defined in the communication protocol to data read from the memory card, and the data must be transmitted to the external apparatus with such additional data attached as thus described.

Such a process of attaching additional data to data read from the memory card is normally carried out on a temporary memory such as a RAM provided in the electronic apparatus. The electronic apparatus is required to perform a process of saving the data in the temporary memory, a process of processing the data on the temporary memory, and a process of reading the data from the temporary memory.

The series of processes for attaching the additional data performed in the temporary memory constitutes another factor which can reduce the rate of data transfer from the memory card to the external apparatus.

The above-described situations leading to a reduction in the data transfer rate are similarly encountered when data is transferred from the external apparatus to the memory card.

When data is transferred from the external apparatus to the memory card, the external apparatus first transmits the data to the electronic. The electronic apparatus temporarily saves the received data in the temporary memory, and the temporarily saved data is thereafter transmitted to the memory card.

The memory card saves the received data in a memory therein.

Under the circumstance, what is desirable for a storage device such as a memory card inserted into an electric apparatus to be used therein is to improve the rate at which data is transferred between the storage device and an external apparatus which is separate from the electronic apparatus.

According to an embodiment of the invention, there is provided a storage device including an input/output section connected to an electronic apparatus, a memory for storing data, a control section accessing the memory based on an instruction input from the electronic apparatus to the input/output section, and a communication section communicating with an external apparatus separate from the electronic apparatus. The control section accesses a range in the memory specified by the electronic apparatus based on the instruction from the electronic apparatus and causes data associated with the accessed range to be transmitted and received between the communication section and the external apparatus.

In the above-described storage device, the control section accesses the memory when an instruction is input from the electronic apparatus to the input/output section. The control section causes data associated with the accessed range to be transmitted and received between the communication section and the external apparatus.

As a result, for example, data stored in the memory can be transmitted from the communication section of the storage device to the external apparatus without passing through the electronic apparatus.

Thus, data stored in the memory can be transmitted to the external apparatus without passing through the electronic apparatus.

Preferably, a transmission instruction specifying a range to be accessed may be input from the electronic apparatus to the input/output section. The control section may read data from the accessed range of the memory and cause the communication section to transmit the read data based on the transmission instruction.

Preferably, the control section may generate additional data for a communication process between the communication section and the external apparatus, attach the additional data to the data read from the memory, and cause the communication section to transmit the read data along with the additional data.

Preferably, a reception instruction specifying a range to be accessed may be input from the electronic apparatus to the input/output section. The control section may cause the communication section to receive data from the external apparatus and write the received data in the accessed range of the memory based on the reception instruction.

Preferably, the communication section may receive data accompanied by additional data attached thereto for a communication process between the communication section and the external apparatus. The control section may delete the additional data from the data received by the communication section to extract data to be written and write the data to be written in the accessed range specified by the reception instruction.

Preferably, the control section may inhibit the electronic apparatus from accessing the memory during a period in which the communication section transmits and receives data from and into the memory based on an instruction from the electronic apparatus.

Preferably, a communication instruction including the specification of a range to be accessed in the memory may be input from the electronic apparatus to the input/output section. The control section may access the range in the memory specified by the electronic apparatus upon the input of the communication instruction including the specification of the range to be accessed in the memory. The control section may cause data associated with the range to be accessed to be transmitted and received data between the communication section and the external apparatus.

Preferably, transmission data and a transmission instruction may be input from the electronic apparatus to the input/output section. The control section may cause the communication section to transmit the transmission data when the transmission data and the transmission instruction are received.

Preferably, the communication section may receive communication data from the external apparatus. The control section may notify the electronic apparatus of the reception of the communication data when the communication section receives the communication data without a reception instruction from the electronic apparatus. The control section may transmit the received communication data from the input/output section to the electronic apparatus based on an instruction from the electronic apparatus in response to the notice.

Preferably, the memory may be anon-volatile memory which holds data even when the storage device is mot mounted in the electronic apparatus.

According to another embodiment of the invention, there is provided a data communication system including a storage device for storing data, an electronic apparatus in which the storage device is removably mounted, and an external apparatus capable of transmitting and receiving communication data, separate from the electronic apparatus. The storage device includes an input/output section connected to the electronic apparatus, a memory for storing data, a control section accessing the memory based on an instruction input from the electronic apparatus to the input/output section, and a communication section communicating with the external apparatus separate from the electronic apparatus. The control section accesses a range in the memory specified by the electronic apparatus based on the instruction from the electronic apparatus and causes data associated with the accessed range to be transmitted and received between the communication section and the external apparatus.

According to the embodiments of the invention, data transfer can be performed at an improved transfer rate between a storage device such as a memory card mounted and used in an electronic apparatus and an external apparatus separate from the electronic apparatus.

BRIEF DESCRIPTION OF THE DRAWINGS

FIG. 15 shows a subroutine of command processing shown in FIG. 14;

FIG. 16 shows a subroutine of a process of receiving communication data from the associated apparatus shown in FIG. 14;

FIG. 17 is a timing chart of transmission of data from the memory card shown in FIG. 1 to an associated apparatus.

DESCRIPTION OF PREFERRED EMBODIMENTS

An embodiment of the invention will now be described with reference to the drawings. The following items will be described in the order listed.

1. Configuration of Data Communication System Including Electronic Apparatus, Storage Device, and External Apparatus
2. Example of Communication Protocol (Transfer Jet)
3. Operations of Data Communication System (the description will focus on operations associated with data communication between the storage device and the external apparatus)

[Configuration of Data Communication System 1]

Figure 1:
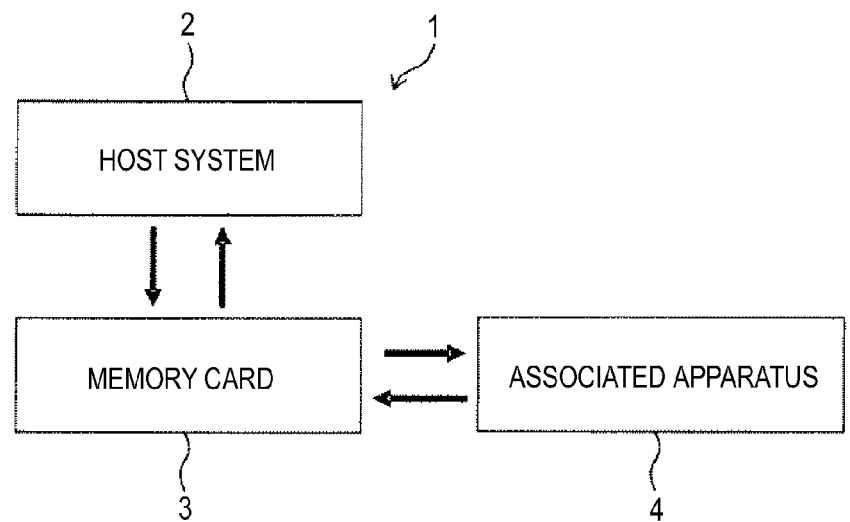
FIG. 1 is a system configuration diagram of a data communication system according to an embodiment of the invention.

FIG. 1 is a system configuration diagram of a data communication system 1 according to an embodiment of the invention.

The data communication system 1 shown in FIG. 1 includes a host system 2 which is an electronic apparatus, a memory card 3, and an associated apparatus 4 which is an external apparatus.

The host system 2 is an apparatus into which the memory card 3 is removably inserted.

For example, the host system 2 may be a digital camera, a portable game machine, or a mobile telephone.

The host system 2 reads data stored in the memory card 3 to perform a process using the data. The host system 2 writes data generated as a result of the process in the memory card 3.

The associated apparatus 4 transmits and receives communication data to and from the memory card 3 on a radio communication basis according to a predetermined communication protocol.

For example, the associated apparatus 4 may be a data server, a liquid crystal monitor, or a personal computer.

When communication data is generated as a result of a process performed in the associated apparatus 4, the apparatus transmits the data to the memory card 3. When the associated apparatus 4 receives data from the memory card 3, the apparatus saves the received data in a memory incorporated in the same.

The incorporated memory may be a hard disk device, an optical recording medium, a semiconductor memory, a RAM (random access memory), or the like.

Figure 2:
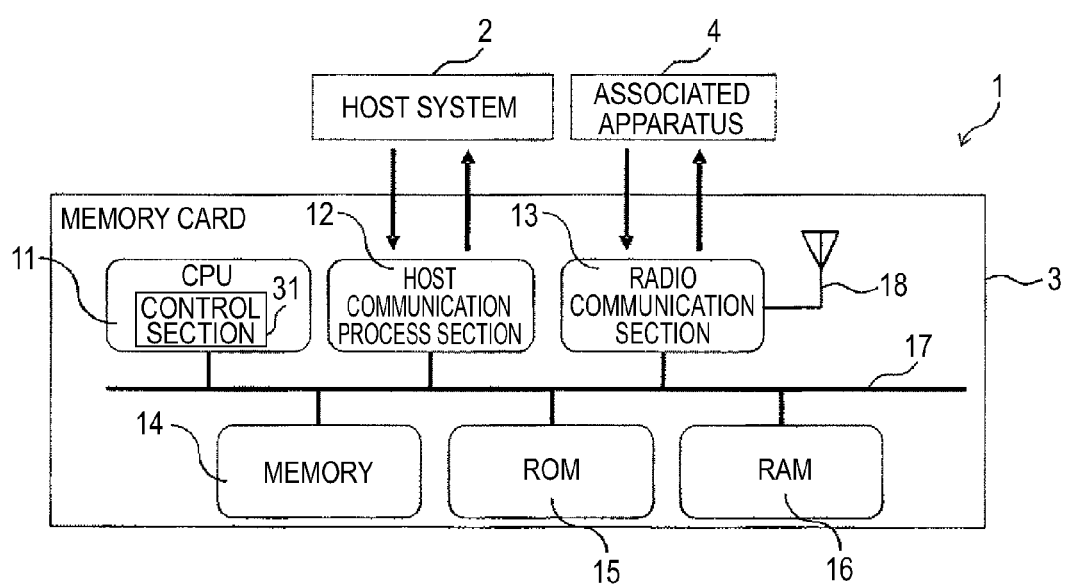
FIG. 2 is a block diagram showing a configuration of the memory card shown in FIG. 1.

FIG. 2 is a block diagram showing a configuration of the memory card 3 shown in FIG. 1.

Referring to FIG. 2, the memory card 3 includes a CPU (central processing unit) 11, a host communication process section 12, and a radio communication section 13. The memory card 3 also includes a memory 14, a ROM (read only memory) 15, a RAM 16, and a system bus 17 connecting those elements.

The memory card 3 has a card-type housing which allows the card to be removably inserted into the host system 2, and the electrical circuit shown in FIG. 2 is contained in the housing.

When the memory card 3 shown in FIG. 2 is inserted into the host system 2, the card is enabled for wired communication with the host system 2.

Thus, data to be used by the host system 2 is saved in the memory card 3, and the saved data is transmitted to the host system 2.

The memory card 3 shown in FIG. 2 communicates with the associated apparatus 4 on a radio communication basis to transmit and receive communication data to and from the associated apparatus 4.

Thus, the memory card 3 transmits data stored in the memory 14 thereof to the associated apparatus 4, and the memory card receives communication data from the associated apparatus 4 and saves the data in the memory 14.

Figure 3:
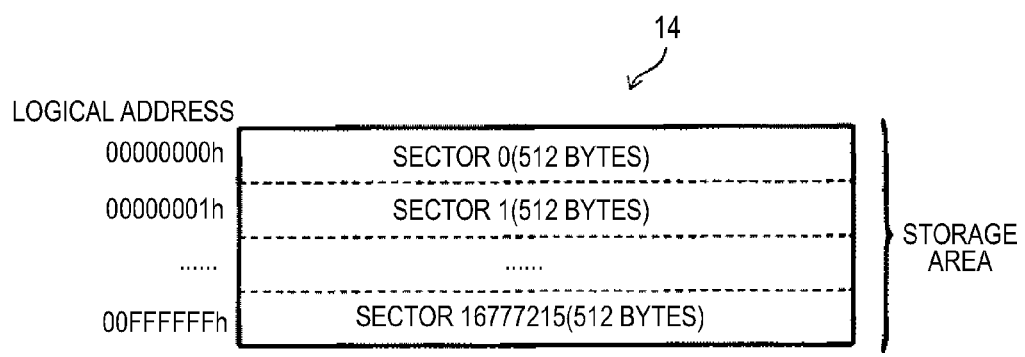
FIG. 3 is an illustration showing a storage area of the memory shown in FIG. 2.

FIG. 3 is an illustration showing a storage area of the memory 14 shown in FIG. 2.

For example, the memory 14 may be a data writable nonvolatile memory such as an EEPROM or flash memory.

Data used by the host system 2 is stored in the memory 14.

Data received through the radio communication section 13 and data input from the host system 2 can be written in the memory 14.

Data saved in the memory 14 can be read to transmit it through the radio communication section 13 or to transmit it to the host system 2.

The memory 14 has a plurality of sectors.

A sector is one of partial storage areas formed by dividing the storage area of the memory 14 using predetermined units of data. When the memory 14 has a storage area of 8 gigabytes, 16777216 sectors each having 512 bytes can be formed.

A logical address to be used for accessing the memory 14 is assigned to each of the sectors. The logical address of each sector has a value unique to the sector, and logical addresses 000000h to FFFFFFh are assigned when the storage area has 8 gigabytes.

The host system 2 accesses the memory 14 of the memory card 3 by specifying a range to be accessed using such an address.

Specifically, the host system specifies a logical address indicating the start position of a storage area and a sector count indicating the range of data to be accessed (data length).

The host communication process section 12 shown in FIG. 2 is an input/output section which is connected to the host system 2 when the memory card 3 is inserted into the host system 2.

When the memory card 3 is inserted into the host system 2, the card is wire-connected to the host system 2. The host communication process section 12 transmits and receives data to and from the host system 2.

For example, various instructions and data are input from the host system 2 to the host communication process section 12.

For example, instructions from the host system 2 include an instruction to cause a data write in the memory 14, an instruction to read data from the memory 14, an instruction to transmit data from the memory 14, and an instruction to receive data from the associated apparatus 4.

For example, data transmitted and received between the host system 2 and the memory card 3 includes data to be stored in the memory 14 and communication data to be transmitted and received between the memory card 3 and the associated apparatus 4.

For example, the host system 2 instructs writing of data into the memory 14 by transmitting a command to write data into the memory 14 to the host communication process section 12 along with information on the range to be accessed in the memory 14 and the data to be written.

For example, the range to be accessed is specified by the starting address and the data length of the range to be accessed.

The host system 2 instructs reading of data from the memory 14 by transmitting a command to read data from the memory 14 to the host communication process section 12 along with information on the range to be accessed in the memory 14.

The host system 2 instructs transmission of data from the memory 14 by transmitting a command to read data from the memory 14 and a data transmission command to the host communication process section 12 along with information on the range to be accessed in the memory 14.

The host system 2 instructs reception of data from the associated device 4 by transmitting a data reception command and a command to write data into the memory 14 to the host communication process section 12 along with information on the range to be accessed in the memory 14.

When the host system 2 transmits data, the host system transmits a data transmission command to the host communication processing section 12 along with the data to be transmitted.

The radio communication section 13 includes an antenna 18, and it transmits and receives communication data to and from the associated apparatus 4 on a radio communication basis according to a predetermined protocol.

The antenna 18 may be incorporated in the housing of the memory card 3. The antenna may alternatively be attached to the housing.

For example, Transfer Jet, UWB (Ultra Wide Band), NFC (Near Field Communication), Bluetooth (registered trademark), or IEEE802.11a/b/g/n may be adopted as the communication protocol.

The RAM 16 shown in FIG. 2 is provided to store programs that the CPU 11 has read in and data to be used for executing the program.

The data used to execute the programs are temporarily stored in the RAM 16.

Programs read and executed by the CPU 11 and the data used by the CPU 11 to execute the programs are stored in the ROM 15.

Programs executed by the CPU 11 of the memory card 3 are referred to as "firmware programs".

A firmware program may be stored in the ROM 15 before the memory card 3 is shipped, and it may alternatively be stored in the ROM 15 after the memory card is shipped.

Referring to the storage of a firmware program in the ROM 15 after the shipment of the card, a firmware program recorded on a computer-readable recording medium such as a CD-ROM may be installed.

Alternatively, a firmware program may be downloaded from a server apparatus through a transmission medium such as the internet and installed in the ROM.

Such a program may be partially or entirely stored in the memory 14.

The CPU 11 is a computer which is activated when the power supply of the memory card 3 is turned on and which reads and executes the programs stored in the ROM 15.

The control section 31 of the memory card 3 is implemented as thus described.

The control section 31 manages operations of the host communication process section 12, the radio communication section 13, and the memory 14 in the memory card 3.

For example, the control section 31 accesses the memory 14 according to a memory access instruction input from the host system 2 to the host communication process section 12.

When a range to be accessed is specified by the host system 2, the control section 31 accesses the range to be accessed.

The control section 31 generates communication data according to a transmission instruction input from the host system 2 to the host communication process section 12 and causes the radio communication section 13 to transmit the communication data to the associated apparatus 4.

For example, communication data generated by the control section 31 may be data read from the memory 14 accompanied by additional data such as header data.

Based on a reception instruction input from the host system 2 to the host communication process section 12, the control section 31 instructs the radio communication section 13 to receive communication data from the associated apparatus 4.

The control section 31 deletes additional data from the received communication data to extract data to be written and writes the extracted data in the range to be accessed specified by the reception instruction.

During a communication process, the control section 31 inhibits the host system 2 from accessing the memory.

[Example of Communication Protocol (Transfer Jet)]

Transfer Jet is a communication protocol according to which electric waves of 4.48 GHz are used at −70 dBm/MHz to achieve short range one-to-one data communication at a maximum rate as high as 560 Mbps.

The antenna 18 in compliance with Transfer Jet may be referred to as "coupler" because it has the function of transmitting and receiving electric waves to and from another antenna 18 utilizing electromagnetic induction.

Figure 4:
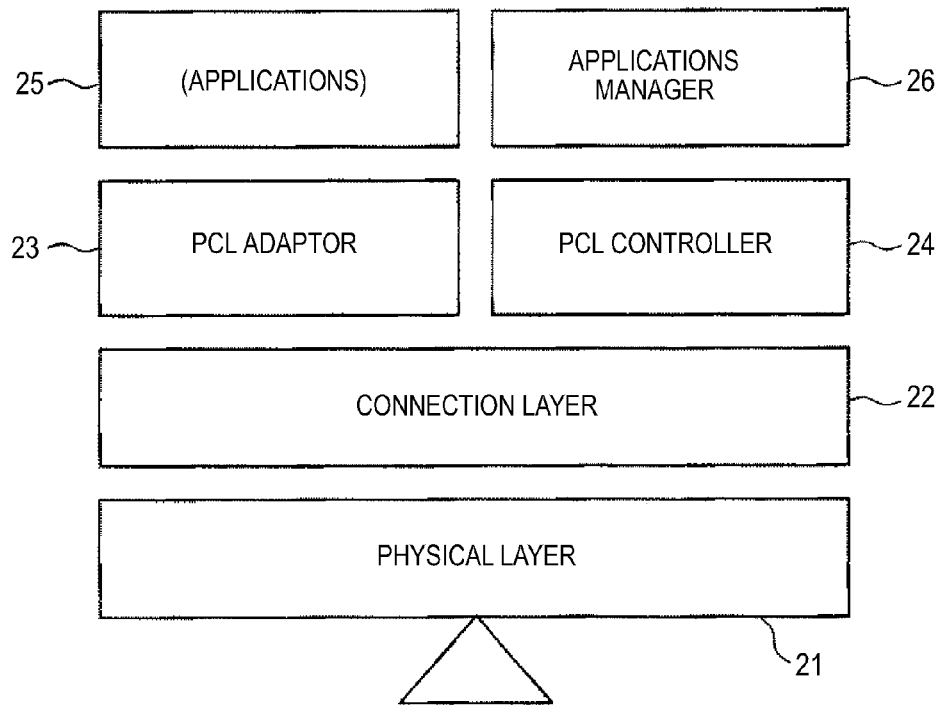
FIG. 4 is an illustration showing an example of a communication protocol stack to be used for radio communication according to Transfer Jet.

FIG. 4 is an illustration showing an example of a communication protocol stack for radio communication according to Transfer Jet.

According to Transfer Jet, a connection layer 22 is stacked on a physical layer 21 that is the lowermost layer.

A protocol conversion adaptor layer 23 and a protocol conversion controller layer 24 are stacked on the connection layer 22.

An application layer 25 is stacked on the protocol conversion adaptor layer 23.

An application manager layer 26 is stacked on the protocol conversion controller layer 24.

For example, the physical layer 21 corresponds to the radio communication section 13.

The connection layer 22 may take form when the CPU 11 executes a program for the communication protocol stored in the ROM 15.

The protocol conversion adaptor layer 23 may take form when the CPU 11 executes a program for a protocol conversion adaptor stored in the ROM 15.

The protocol conversion controller layer 24 may take form when the CPU 11 executes a program for a protocol conversion controller stored in the ROM 15.

The application layer 25 may take form when the CPU 11 executes various application programs stored in the ROM 15.

The application manager layer 26 may take form when the CPU 11 executes an operating system stored in the RAM 15.

When radio communication takes place between two apparatus according to Transfer Jet, for example, application data is communicated between the application layers 25 of the apparatus.

For example, such application data is output from the application layer 25 of one of the apparatus to the physical layer 21 via the protocol conversion adaptor layer 23 and the connection layer 22.

The application data is transmitted to the other apparatus from the physical layer 21.

The protocol conversion adaptor layer 23 and the connection layer 22 attach various types of additional data to the application data to generate communication data in compliance with Transfer Jet communication protocol.

Figure 5:
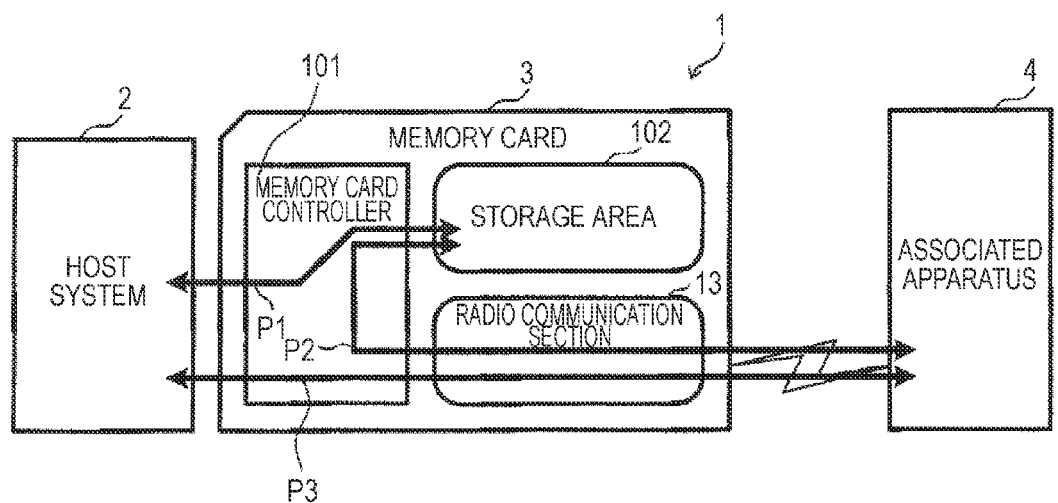
FIG. 5 is a diagram for explaining data transfer paths in the data communication system shown in FIG. 1.

FIG. 5 is a diagram for explaining data transfer paths in the data communication system 1 shown in FIG. 1.

FIG. 5 shows a memory card 3 having a memory card controller 101, a storage area 102, and a radio communication section 13.

The memory card controller 101 forms part of a control section 31 which will be described later.

The storage area 102 forms part of a memory 14.

The data communication system 1 shown in FIG. 1 has a first data path P1, a second data path P2, and a third data path P3 as paths for transferring data.

The first data path P1 is a path for transferring data between the host system 2 and the storage area 102. Data in the first data path P1 is transferred via the memory card controller 101.

The host system 2 writes data in the storage area 102 and reads data from the storage area 102 using the first data path P1.

The second data path P2 is a path for transferring data between the storage area 102 and the associated apparatus 4. Data in the second data path P2 is transferred via the memory card controller 101 and the radio communication section 13.

The memory card controller 101 reads data from the storage area 102 of the memory card 3 using the second data path P2 and transfers the data read from memory card 3 to the associated apparatus 4 via the radio communication section 13.

The memory card controller 101 receives data from the associated apparatus 4 using the second data path P2 and saves the received data in the storage area 102.

The third data path P3 is a path for transferring data between the host system 2 and the associated apparatus 4. Data in the third data path P3 is transferred via the memory card controller 101 and the radio communication section 13.

The host system 2 transmits data to the associated apparatus 4 and receives data from the associated apparatus 4 using the third data path P3.

Figure 6:
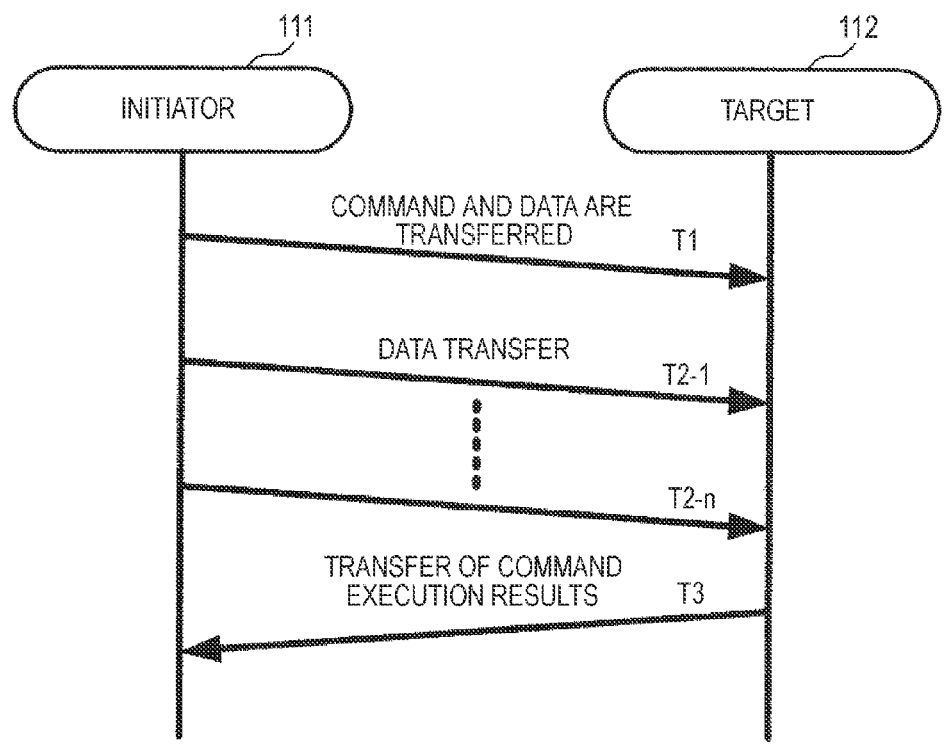
FIG. 6 is a diagram for explaining an example of a communication procedure according to Transfer Jet.

FIG. 6 is a diagram for explaining an example of a communication procedure according to Transfer Jet. FIG. 6 shows an example of data transfer from the memory card 3 to the associated apparatus 4. In the example shown in FIG. 6, the memory card 3 functions as an initiator 111 and the associated apparatus 4 functions as a target 112.

When data is transferred from an initiator 111 to a target 112, the initiator 111 transmits a command and data (T1). When the command and the data are received, the target 112 executes the command to process the received data.

When the initiator 111 transfers plural pieces of data, the target 112 processes the pieces of data thus received (T2-1 to T2-n).

When the execution of the command is finished, the target 112 transmits results of the execution of the command to the initiator 111 (T3). The results of the execution of the command include information indicating that the data has been properly processed or information indicating that the data has not been properly processed because of an error encountered during the process and other types of information.

Figure 7:
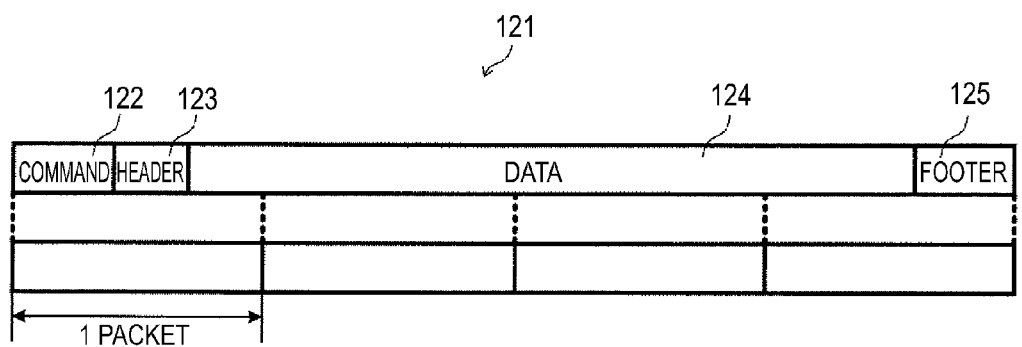
FIG. 7 is an illustration showing an example of a format to be used for a command and data transferred at process T1 shown in FIG. 6.

FIG. 7 is an illustration showing an example of a format used for the command and data transferred at process T1 shown in FIG. 6.

Formatted data 121 shown in FIG. 7 includes command data 122, header data 123, data 124, and footer data 125. The formatted data 121 for transferring the command and data is defined according to a radio communication standard such as Transfer Jet. The command data 122 is data representing a command executed by the target 112.

The data 124 is data to be processed by the target 112. The header data 123 and the footer data 125 are data or information representing the data length and the command used to instruct the data transfer. The header data 123 and the footer data 125 are defined according to the radio communication standard.

The formatted data 121 shown in FIG. 7 is transferred, for example, in the form of packets obtained by dividing the data according to the radio communication standard.

Figure 8:
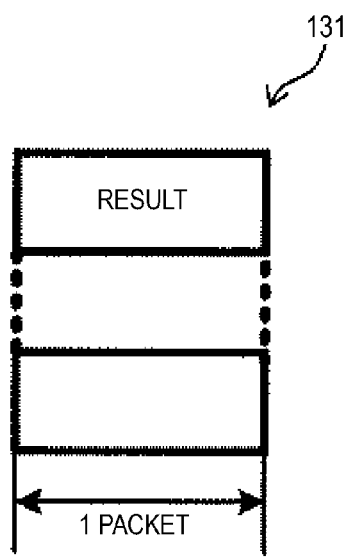
FIG. 8 is an illustration of an example of a format to be used for command execution results transferred at process T3 shown in FIG. 6.

FIG. 8 is an illustration of an example of a format to be used for the command execution results transferred at the process T3 shown in FIG. 6.

Command execution results data 131 shown in FIG. 8 includes data indicating results of the execution of the command by the target 112. The data format of the command execution results data is defined according to a radio communication standard such as Transfer Jet.

The command execution results data shown in FIG. 8 is transferred, for example, in the form of one packet defined according to the radio communication standard.

Figure 9:
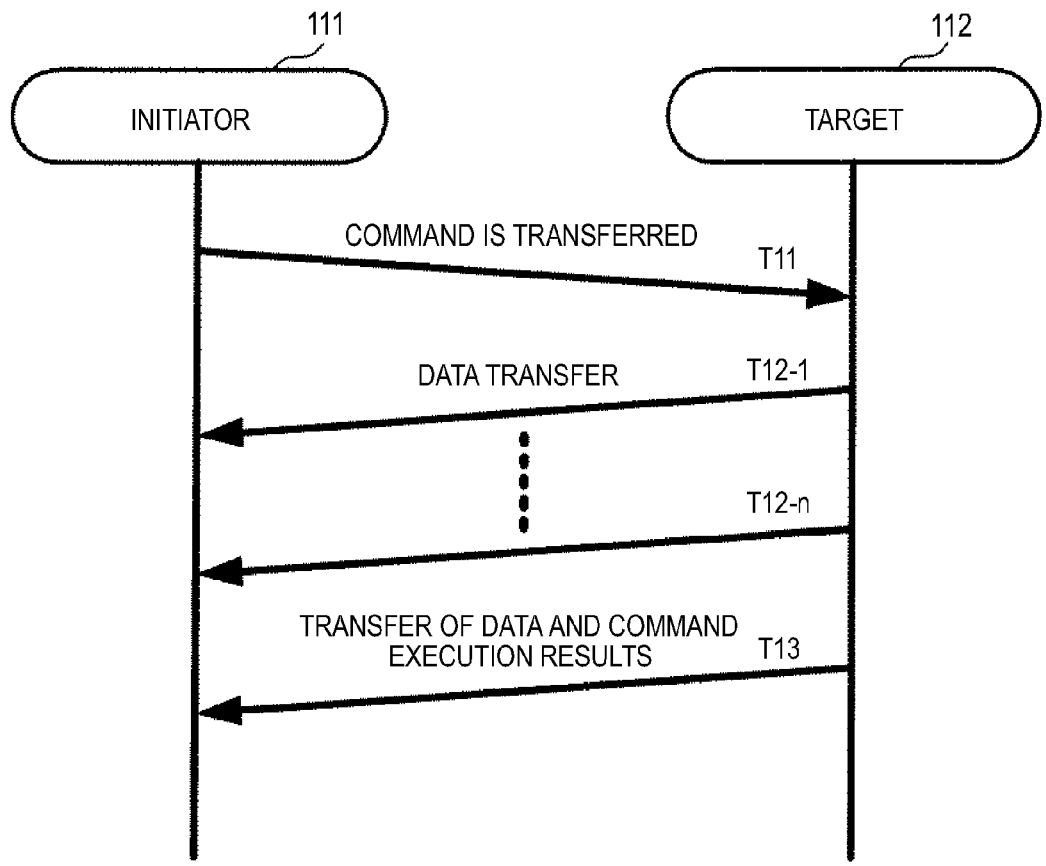
FIG. 9 is a diagram for explaining an example of another communication procedure according to Transfer Jet.

FIG. 9 is a diagram for explaining an example of another communication procedure according to Transfer Jet. FIG. 9 shows an example in which data is transferred from the associated apparatus 4 to the memory card 3. In the example shown in FIG. 9, the memory card 3 functions as an initiator 111 and the associated apparatus 4 functions as a target 112.

When data is to be transferred from the target 112 to the initiator 111, the initiator 111 transmits a command (T11).

Upon receipt of the command, the target 112 executes the command. The target 112 transmits data requested by the command (T12-1 to T12-n).

After the transfer of plural pieces of data is finished, the target 112 transmits results of the execution of the command to the initiator 111 (T13). The results of the execution of the command include information indicating that the data has been properly processed or information indicating that the data has not been properly processed because of an error encountered during the process and other types of information.

Figure 10:
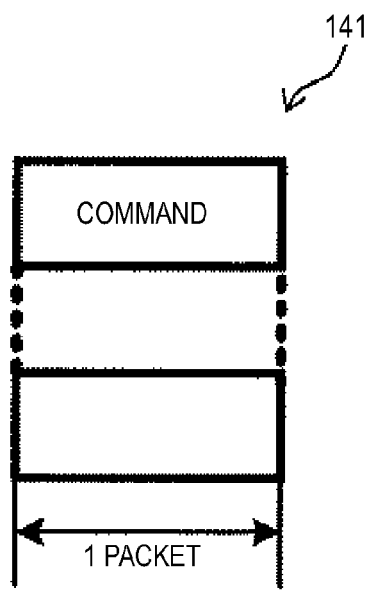
FIG. 10 is an illustration showing an example of a format to be used for a command transferred at process T11 shown in FIG. 9.

FIG. 10 is an illustration showing an example of a format used for the command transferred at process T11 shown in FIG. 9.

Command data 141 shown in FIG. 10 includes data representing the command executed by the target 112. The command data 141 is defined according to a radio communication standard such as Transfer Jet.

The command data shown in FIG. 10 is transferred, for example, in the form of one packet defined according to the radio communication standard.

Figure 11:
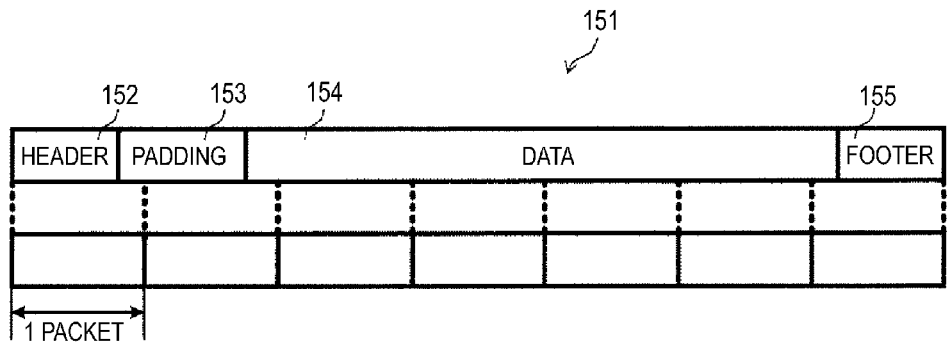
FIG. 11 is an illustration of an example of a format to be used for data transferred at process T12 shown in FIG. 9.

FIG. 11 is an illustration of an example of a format to be used for the data transferred at process T12 shown in FIG. 9.

Formatted data 151 shown in FIG. 11 includes header data 152, padding data 153, actual data 154, and footer data 155. The format data 151 is defined according to a radio communication standard such as Transfer Jet.

Application data to be communicated between the apparatus according to Transfer Jet is stored as the actual data 154. For example, the application data may be data stored in the memory 14.

The padding data 153 is data that is added to the communicated data to change the data length of the data to a predetermined data length suitable for communication.

The header data 152 and the footer data 155 are data or information representing the data length and the command used to instruct the data transfer. The header data and the footer data are defined according to the radio communication standard.

For example, pieces of data to be used by the connection layer 22, the protocol conversion adaptor layer 23, and the protocol conversion controller layer 24 according to Transfer Jet are stored as the header data 152 and the footer data 155.

The header data 152 and the footer data 155 may include information on the actual data 151, e.g., the data type and the data format of the same.

The format data shown in FIG. 11 is transferred, for example, in the form of packets obtained by dividing the data according to the radio communication standard.

When the data is communicated according to Transfer Jet, the protocol conversion adaptor layer 23 and the connection layer 22 attach the header data, footer data, and padding data to the actual data to generate the formatted data 151 shown in FIG. 11. The physical layer 21 transmits the formatted data 151.

Figure 12:
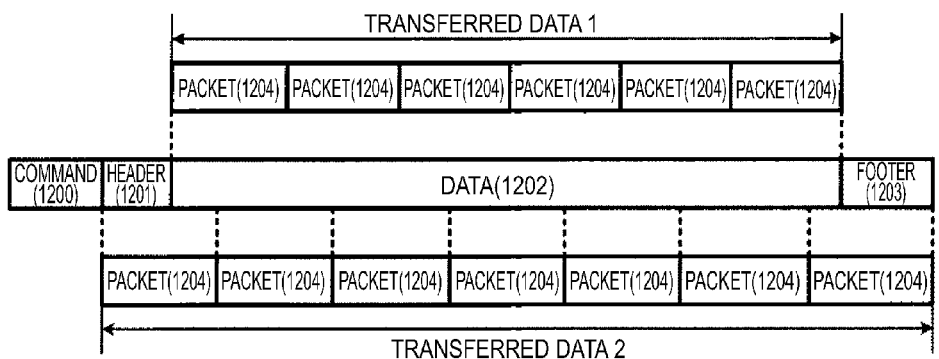
FIG. 12 is an illustration of examples of data processed in the memory card according to a data reception command and a write command and according to a command for reception of data accompanied by a header and a footer and a write command.

FIG. 12 is an illustration of examples of data processed in the memory card 3 according to a data reception command and a write command and according to a command for reception of data added with a header and a footer and a write command.

Transferred data 1 (1600) shown in FIG. 12 is data processed in the memory card 3 when the host system 2 executes a data reception command and a write command.

Transferred data 2 (1601) shown in FIG. 12 is data processed in the memory card 3 when the host system 2 executes a command for reception of data added with a header and a footer and a write command.

Figure 13:
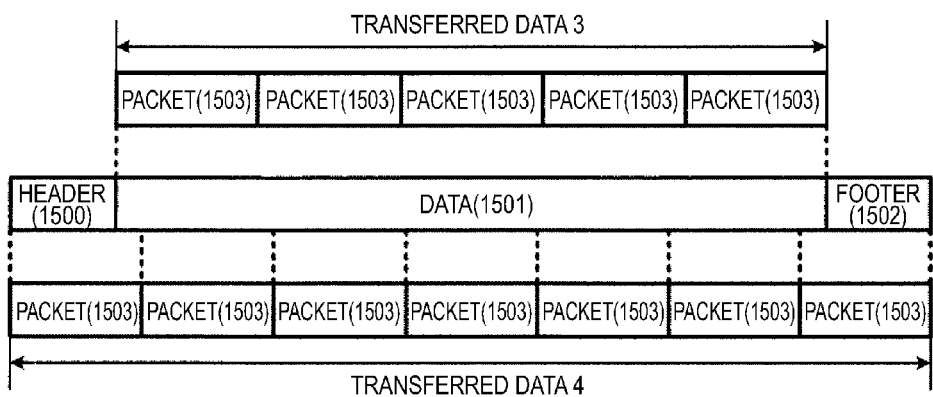
FIG. 13 is an illustration of data processed in the memory card 3 according to a read command and a data transmission command and according to a read command and a command for transmission of data accompanied by a header and a footer.

FIG. 13 is an illustration of data processed in the memory card 3 according to a read command and a data transmission command and according to a read command and a command for transmission of data added with a header and a footer.

Transferred data 3 (1700) shown in FIG. 13 is data processed in the memory card 3 when the host system 2 executes a read command and a data transmission command.

Transferred data 4 (1701) shown in FIG. 13 is data processed in the memory card 3 when the host system 2 executes a read command and a command for reception of data added with a header and a footer.

[Operations of Data Communication System 1]

Operations of the data communication system 1 shown in FIG. 1 will now be described.

The operations will be described below by describing an instance in which the memory card 3 transmits data stored in the memory 14 to the associated apparatus 4 according to an instruction from the host system 2.

Figure 14:
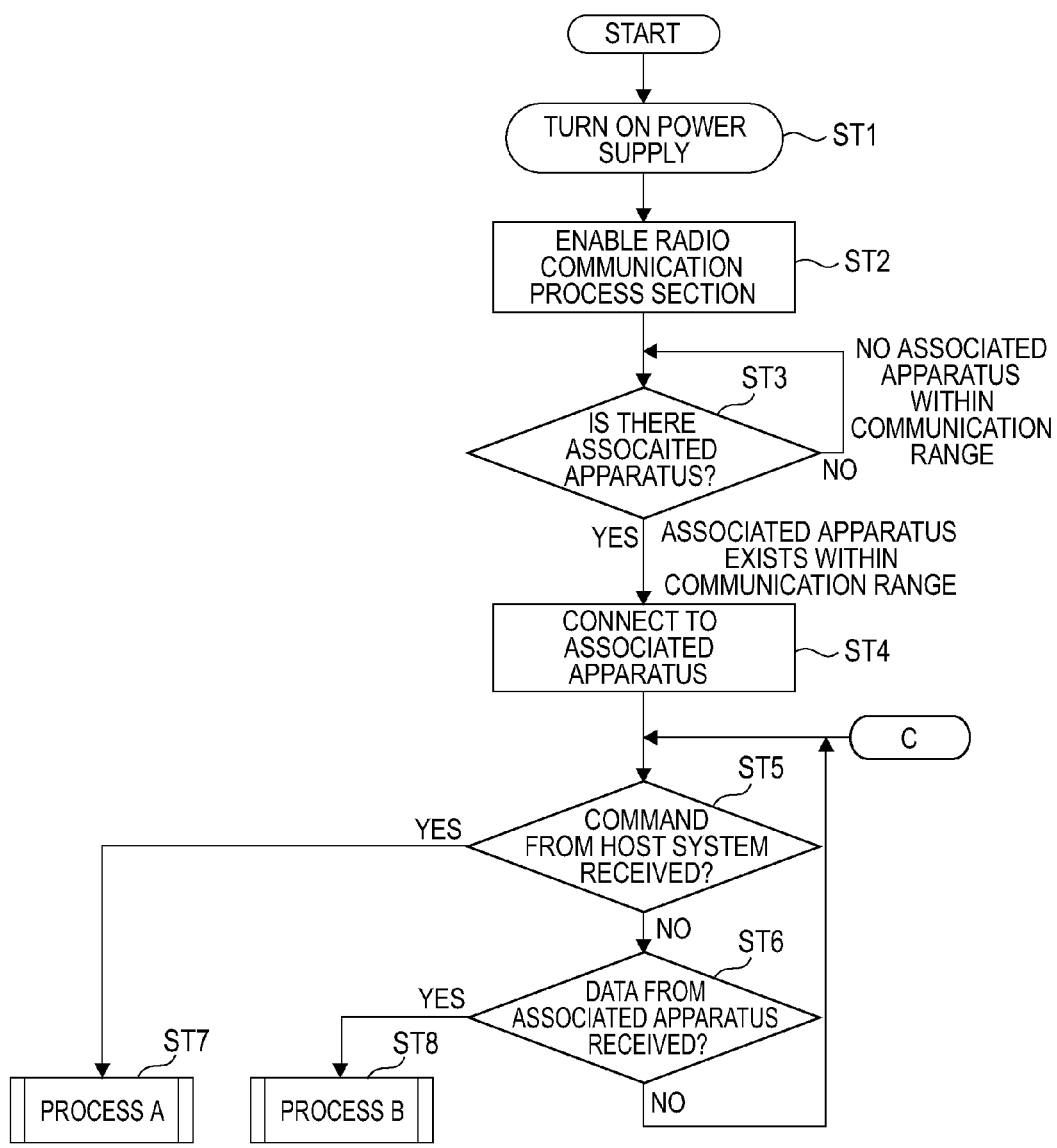
FIG. 14 is a main flow chart of control processes executed by the control section shown in FIG. 2.

FIGS. 14 to 16 are flowcharts showing a flow of a control process carried out by the CPU 11 of the memory card 3 shown in FIG. 2.

FIG. 14 is a main flow chart of the control process.

FIG. 15 shows a subroutine of command processing shown in FIG. 14.

FIG. 16 shows a subroutine of the process of receiving communication data from the associated apparatus 4 shown in FIG. 14.

As shown in FIG. 14, when the power supply of the memory card 3 is turned on (step ST1), the CPU 11 shown in FIG. 2 reads and executes programs.

Thus, the control section 31 of the memory card 3 is implemented.

The power supply of the memory card 3 is turned on, for example, when the memory card 3 is inserted into the host system 2.

When the power supply is turned on, the control section 31 enables the radio communication section 13 (step ST2).

The process of enabling the radio communication section 13 may be started according to a command from the host system 2 or according to a register setting.

Thus, the radio communication section 13 and the CPU 11 are enabled for communication according to a predetermined protocol.

For example, a connection layer 22, a protocol conversion adaptor layer 23, an application layer 25, a protocol conversion controller layer 24, and an application manager layer 26 according to Transfer Jet are implemented in the CPU 11.

When the radio communication section 13 is enabled, the control section 31 searches the associated apparatus 4 (step ST3).

When the associated apparatus 4 is not located within the communication range of the memory card 3, the control section 31 repeats the process of searching the associated apparatus 4.

When the associated apparatus 4 is found, the control section 31 executes a process of connecting to the associated apparatus 4 (step ST4).

The control section 31 makes a setting required for communication with the associated apparatus 4.

Thus, a communication line is established between, for example, the connection layer 22 of the memory card 3 and a connection layer 22 of the associated apparatus 4.

The application layer 25 of the memory card 3 and an application layer 25 of the associated apparatus 4 thus enter a state in which they can transmit and receive data to and from each other.

The process of searching the associated apparatus 4 and the process of connecting to the apparatus may be started according to commands from the host system 2 or according to register settings.

When the above-described process of establishing a communication line is completed, the control section 31 enters a state of waiting for an instruction from the host system 2.

In the instruction waiting state, the control section 31 repeats determination of whether a command has been received from the host system 2 and determination of whether communication data has been received from the associated apparatus 4 (steps ST5 and ST6).

When a command is received from the host system 2, the control section 31 starts the process of executing the command as shown in FIG. 15 (step ST7).

When the host communication process section 12 receives a command from the host system 2, the control section 31 starts the process of executing the command.

At the process of executing a command from the host system 2 shown in FIG. 15, the control section 31 determines the type of the instruction received from the host system 2.

Referring to FIG. 15, the control section 31 determines whether the received instruction is an instruction to write data in the memory, an instruction to readout data from the memory, an instruction to transmit data from the memory, an instruction to receive data into the memory, an instruction to transmit data accompanied by additional data from the memory, or an instruction to receive data accompanied by additional data into the memory (steps ST11 to ST16).

When the determination reveals that the instruction from the host system 2 is not any of the instruction types listed, the control section 31 executes the command received from the host system 2 (step ST16).

For example, when a data transmission command is received along with data to be transmitted, the control section 31 transmits the data received from the host system. 2 through the radio communication section 13.

Thereafter, the control section 31 returns to the state of waiting for an instruction from the host system 2 shown in FIG. 14 (steps ST5 and ST6).

When the received instruction is a memory write instruction or a memory readout instruction, the control section 31 determines YES at step ST11 or ST12.

The control section determines whether the memory 14 can be accessed (step ST18).

As will be described later, the control section 31 inhibits the host system 2 from accessing the memory during a communication process.

When access to the memory is inhibited, the control section 31 determines that the memory 14 cannot be accessed.

The control section 31 notifies the host system 2 that the instruction cannot be executed (step ST19).

Specifically, the control section 31 outputs an instruction unexecutable notice to the host communication process section 12.

The host communication process section 12 outputs the instruction unexecutable notice to the host system 2

Thereafter, the control section 31 returns to the state of waiting for an instruction from the host system 2 shown in FIG. 14 (steps ST5 and ST6).

When access to the memory is not inhibited, the control section 31 determines that the memory 14 can be accessed.

The control section 31 executes the instruction from the host system 2 (step ST17).

In the case of a memory write instruction, the control section 31 writes data to be written received from the host system 2 in a range of addresses in the memory 14 specified by the host system 2.

In the case of a memory readout instruction, the control section 31 reads data from a range of addresses in the memory 14 specified by the host system 2 and transmits the read data to the host system 2.

Specifically, the control section 31 outputs the read data to the host communication process section 12.

The host communication process section 12 transmits the read data to the host system 2.

After the instruction from the host system 2 is executed, the control section 31 returns to the state of waiting for an instruction from the host system 2 shown in FIG. 14 (steps ST5 and ST6).

When the instruction received is an instruction to transmit data from the memory, an instruction to receive data into the memory, an instruction to transmit data accompanied by additional data from the memory, or an instruction to receive data accompanied by additional data into the memory, the determination at any of steps ST13 to ST16 results in the answer "YES".

The control section 31 determines whether the memory 14 can be accessed (step ST20).

When the memory 14 cannot be accessed, the control section 31 notifies the host system 2 that the instruction cannot be executed (step ST19).

Thereafter, the control section 31 returns to the state of waiting for an instruction from the host system 2 (steps ST5 and ST6).

When the memory 14 can be accessed, the control section 31 inhibits the host system 2 from accessing the memory (step ST21).

For example, the control section 31 writes an access inhibit flag in a predetermined flag register of the RAM 16 or the memory 14. Based on the access inhibit flag, the control section 31 determines whether access to the memory is inhibited or not.

After access to the memory is inhibited, the control section 31 executes the instruction from the host system 2 (step ST22).

When it is instructed to transmit data from the memory, the control section 31 reads data from a range of addresses in the memory 14 specified by the host system 2.

The control section 31 outputs the data thus read to the radio communication section 13.

The radio communication section 13 transmits the read data input from the control section 31 to the associated apparatus 4.

Thus, the associated apparatus 4 receives data which has been recorded in the memory card 3.

For example, when the associated apparatus 4 is a liquid crystal monitor, the apparatus displays the received data.

When it is instructed to receive data into the memory, the control section 31 generates a data transmission request and outputs it to the radio communication section 13.

The radio communication section 13 transmits the data transmission request input from the control section 31 to the associated apparatus 4.

The radio communication section 13 receives communication data associated with the data transmission request from the associated apparatus 4 and outputs the communication data to the control section 31.

The control section 31 writes the received communication data in a range of addresses in the memory 14 specified by the host system 2.

When it is instructed to transmit data accompanied by additional data from the memory, the control section 31 reads data from a range of addresses in the memory 14 specified by the host system 2.

The control section 31 attaches predetermined additional data to the read data and outputs the data to the radio communication section 13.

The radio communication section 13 transmits the communication data input from the control section 31 to the associated apparatus 4.

When it is instructed to receive data accompanied by additional data into the memory, the control section 31 generates a request for transmission of data accompanied by additional data and outputs the request to the radio communication section 13.

The radio communication section 13 transmits the transmission request input from the control section 31 to the associated apparatus 4.

The radio communication section 13 receives communication data accompanied by additional data according to the transmission request from the associated apparatus 4 and outputs the communication data to the control section 31.

The control section 31 deletes the additional data from the communication data thus received to generate data to be written.

The control section 31 writes the data to be written in a range of addresses in the memory 14 specified by the post system 2.

When the execution of the instruction received from the host system 2 is finished, the control section 31 cancels the memory access inhibition placed on the host system 2 (step ST23).

The control section 31 writes an access inhibition cancellation flag, for example, in a flag register.

Thereafter, the control section 31 returns to the state of waiting for an instruction from the host system 2 shown in FIG. 14 (steps ST5 and ST6).

When communication data is received from the associated apparatus 4 in the state of waiting for an instruction from the host system 2 shown in FIG. 14 (steps ST5 and ST6), the control section 31 starts the process of receiving communication data from the associated apparatus 4 as shown in FIG. 16 (step ST8).

When the radio communication section 13 receives the communication data, the control section 31 starts the process of receiving the communication data.

At the process of receiving the communication data from the associated apparatus 4 shown in FIG. 16, the control section 31 saves the received communication data in a vacant area or a predetermined area of the memory 14 (step ST31).

After saving the received data in the memory 14, the control section 31 determines the state of execution of an instruction at the memory card 3 (step ST32).

Specifically, the control section 31 determines whether an instruction to receive data into the memory or an instruction to receive data accompanied by additional data into the memory is being executed.

When either instruction to receive data into the memory or instruction to receive data accompanied by additional data into the memory is being executed, the control section 31 returns to the state of waiting for an instruction from the host system 2 as shown in FIG. 14 (steps ST5 and ST6).

When neither instruction to receive data into the memory nor instruction to receive data accompanied by additional data into the memory is being executed, the control section 31 notifies the host system 2 that the data has been received (step ST33).

Specifically, the control section 31 outputs a data reception notice to the host communication process section 12.

The host communication process section 12 transmits the data reception notice to the host system 2.

Thereafter, the control section 31 returns to the state of waiting for an instruction from the host system 2 as shown in FIG. 14 (steps ST5 and ST6).

Upon receipt of the data reception notice from the memory card 3, the host system 2 transmits a memory readout instruction to the memory card 3.

Thus, the control section 31 executes the process of executing instructions as shown in FIG. 15.

At step ST17 shown in FIG. 16, the control section 31 transmits the received data which has been temporarily saved in the memory 14 to the host system 2.

FIG. 17 is a timing chart of transmission of data from the memory card 3 to the associated apparatus 4.

When data in the memory card 3 is to be transmitted to the associated apparatus 4, the host system 2 instructs the memory card 3 to perform transmission of data from memory transmission (step ST41).

This instruction may be either instruction to transmit data from the memory or instruction to transmit data accompanied by additional data from the memory.

In the case of an instruction to transmit data from the memory, the starting logical address of the storage area having the data to be transmitted and the length of the data to be read are specified.

When the memory card 3 receives an instruction to transmit data in the memory thereof from the host system 2, the control section 31 inhibits the host system 2 from accessing the memory (step ST42).

The control section 31 notifies the host system 2 that the execution of the instruction is started (step ST43).

When access to the memory is inhibited, the host system 2 cannot access the storage areas of the memory 14.

However, the host system 2 can cause the memory card 3 to execute an instruction involving no access to the memory.

The host system 2 can also execute other tasks which do not involve the memory card 3.

After inhibiting the host system 2 from accessing the memory, the control section 31 reads data from a range of addresses specified by the host system 2 to generate communication data.

The control section 31 causes the radio communication section 13 to transmit the communication data thus generated to the associated apparatus 4 (step ST44).

The communication data thus generated may have either data structure formed only by the data read from the memory or data structure formed by the data read from the memory accompanied by additional data such as header data attached thereto.

When the transmission of all data within the accessed range specified by the host system 2 is completed, the control section 31 cancels the inhibition of memory access placed on the host system 2 (step ST45).

The control section 31 notifies the host system 2 that the execution of the instruction has been completed (step ST46).

Figure 18:
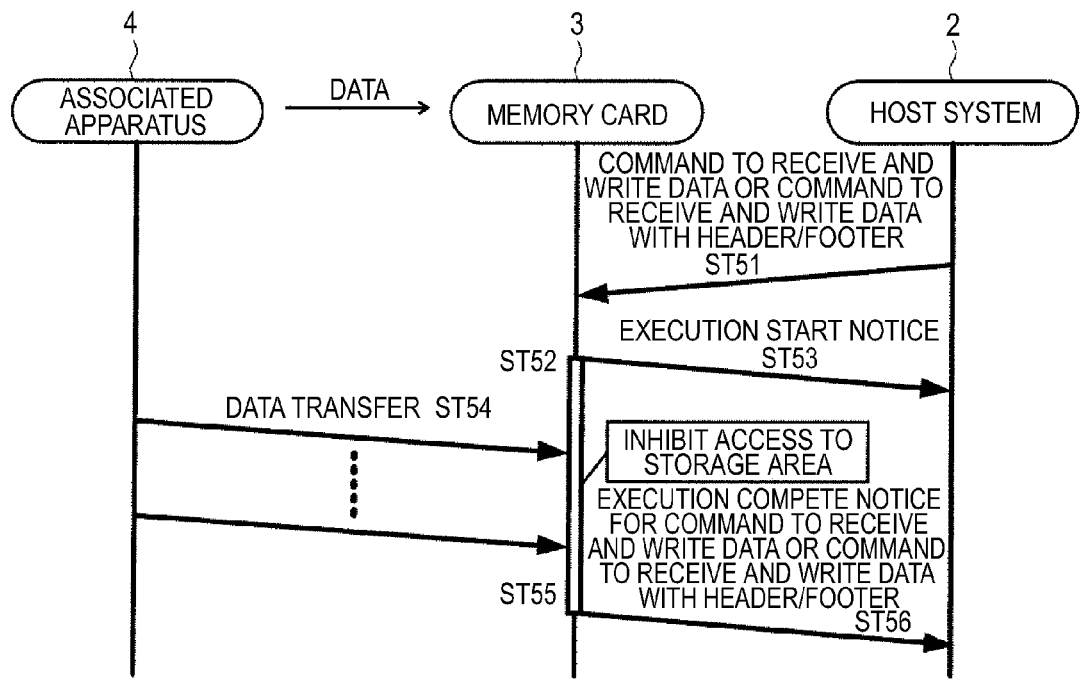
FIG. 18 is a timing chart of transmission of data from the associated apparatus to the memory card.

FIG. 18 is a timing chart of transmission of data from the associated apparatus 4 to the memory card 3.

When data is to be transmitted from the associated apparatus 4 to the memory card 3, the host system 2 instructs the memory card 3 to receive the data into the memory thereof (step ST51).

This instruction may be either instruction to receive data into the memory or instruction to receive data accompanied by additional data into the memory.

In the case of an instruction to receive data into the memory, the starting logical address of the storage area where received data is to be stored and the length of the data to be written are specified.

When the memory card 3 receives an instruction to receive data into the memory from the host system 2, the control section 31 inhibits the host system 2 from accessing the memory (step ST52).

The control section 31 notifies the host system 2 that the execution of the instruction is started (step ST53).

After inhibiting the host system 2 from accessing the memory, the control section 31 receives communication data from the associated apparatus 4 at the radio communication section 13 (step ST54).

When the received communication data is data accompanied by additional data such as header data attached thereto, the control section 31 deletes the additional data from the received data to generate data to be written.

The control section 31 writes the data to be written thus generated in the range of addresses in the memory 14 specified by the host system 2.

When the writing of the received data in the accessed range specified by the host system 2 is completed, the control section 31 cancels the inhibition of memory access placed on the host system 2 (step ST55).

The control section 31 notifies the host system 2 that the execution of the instruction has been completed (step ST56).

As thus described, in the data communication system 1 of the present embodiment, the host system 2 instructs the memory card 3 to transmit data from the memory. Thus, data in the memory card 3 is directly transmitted from the memory card 3 to the associated apparatus 4.

In the present embodiment, the host system 2 instructs the memory card 3 to receive data into the memory. Thus, data is directly transmitted from the associated apparatus 4 to the memory card 3.

Therefore, according to the present embodiment, data can be transferred at a rate higher than the rate at which data is transmitted and received between the memory card 3 and the associated apparatus 4 via the host system 2.

In the present embodiment, since header data and the like required by a communication protocol are processed in the memory card 3, data can be transferred at a rate higher than a transfer rate achievable when such a process is executed by the host system 2.

For example, let us assume that a memory card 3 is inserted into a host system 2 which is a portable game machine or a digital camera unlike the present embodiment and that data saved in the memory card 3 is transmitted from the host system 2 to an associated apparatus 4.

In this comparative example, the data saved in the memory card 3 is transferred via the RAM 16 in the host system 2 and a non-volatile memory for temporarily saving the data.

As a result, the data transfer process will involve an overhead. Such an overhead occurs at each data transfer. Therefore, in this comparative example, communication between the host system 2 and the associated apparatus 4 will have a low data transfer rate.

In the comparative example, since data is transferred via the host system 2, communication must be established at least twice in order to perform one data transfer to the associated apparatus 4.

Especially, when data is transmitted to the associated apparatus 4 using the radio communication section 13 of the memory card 3, at least two communication operations take place in a serial manner between the host system 2 and the memory card 3.

Thus, the data transfer rate of this comparative example is low.

In the embodiment of the invention, the memory card 3 inhibits access to the memory during a data transfer.

Therefore, according to the present embodiment, the associated apparatus 4 and the host system 2 can be prevented from writing data in the same address simultaneously or from writing data over each other's data that is being written.

As a result, no data mismatch occurs between the associated apparatus 4 and the memory card 3.

The memory card 3 transmits data within a range of addresses specified by the host system 2 and receives data to be written in such a range of addresses.

Therefore, in the present embodiment, no data transfer from the memory card 3 to the associated apparatus 4 will take place regardless of the intention of the host system 2.

The above-described embodiment is an example of a preferred mode of carrying out the invention, but the invention is not limited to such an embodiment. Various modifications may be made without departing from the spirit of the invention.

For example, in the above-described embodiment, the memory card 3 transmits and receives data to and from the associated apparatus 4. For example, the storage device transmitting and receiving data to and from the associated apparatus 4 may alternatively be a USB (Universal Serial Bus) memory or a portable memory device having a radio communication section 13 which can be connected to the host system 2.

In the above-described embodiment, the host system 2 into which the memory card 3 is removably inserted is a digital camera, a portable game machine, a mobile telephone, or the like, and the associated apparatus 4 is a data server, a liquid crystal monitor, a personal computer, or the like.

For example, the host system 2 may alternatively be a data server, a liquid crystal monitor, a personal computer, a home electronic apparatus, an AV apparatus, or a navigation apparatus.

The associated apparatus 4 may be a digital camera, a portable game machine, a mobile telephone, or an automobile.

In the above-described embodiment, the host system 2 and the memory card 3 communicate with each other on a wired communication basis, and the memory card 3 and the associated apparatus 4 communicate with each other on a radio communication basis.

Alternatively, the host system 2 and the memory card 3 communicate with each other on a radio communication basis, and the memory card 3 and the associated apparatus 4 communicate with each other on a wired communication basis.

The present application contains subject matter related to that disclosed in Japanese Priority Patent Application JP 2009-239949 filed in the Japan Patent Office on Oct. 19, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A storage device comprising:
an input/output section configured to communicate with an electronic apparatus to which the storage device is connectable;
a memory for storing data;
a control section configured to access the memory based on an instruction from the electronic apparatus, the instruction being input to the input/output section; and
a communication section configured to communicate with an external apparatus that is separate from the electronic apparatus,
wherein,
the instruction from the electronic apparatus includes an instruction that is a transmission instruction to transmit data from the memory to the external apparatus or a reception instruction to receive data into the memory from the external apparatus,
based on the transmission instruction from the electronic apparatus, the control section causes data to be read from the memory and transmitted from the communication section to the external apparatus,
based on the reception instruction from the electronic apparatus, the control section causes data to be received by the communication section from the external apparatus and written into the memory, and
(i) upon a receipt of the transmission instruction from the electronic apparatus, the control section responsively inhibits the electronic apparatus from accessing the memory for a period during which data is read from the memory and transmitted to the external apparatus in response to the transmission instruction from the electronic apparatus, and
(ii) upon a receipt of the reception instruction from the electronic apparatus, the control section responsively inhibits the electronic apparatus from accessing the memory for a period during which data is received from the external apparatus and written into the memory in response to the reception instruction from the electronic apparatus, and
when the communication section receives communication data from the external apparatus without first receiving the reception instruction from the electronic apparatus to receive data into the memory from the external apparatus, the control section (i) responsively saves the communication data in the memory and transmits a notice to the electronic apparatus that notifies the electronic apparatus of the reception of the communication data from the external apparatus, and (ii) thereafter causes the received communication data to be transmitted from the input/output section to the electronic apparatus in response to a memory readout instruction received from the electronic apparatus in response to the notice.

2. The storage device of claim 1, wherein:
the transmission instruction specifies a range in the memory to be accessed by the control section, and
based on the transmission instruction, the control section reads data from the specified range in the memory and causes the communication section to transmit the read data to the external apparatus.

3. The storage device of claim 2, wherein the control section generates additional data for communication between the communication section and the external apparatus, attaches the additional data to the read data, and causes the communication section to transmit the read data along with the additional data to the external apparatus.

4. The storage device of claim 2, wherein the range in the memory specified by the electronic apparatus includes a logical address indicating a start position of a storage area and a data length.

5. The storage device of claim 1, wherein:
the reception instruction specifies a range in the memory to be accessed by the control section, and
based on the reception instruction, the control section causes the communication section to receive data from the external apparatus and writes the received data in the specified range in the memory.

6. The storage device of claim 5, wherein the range in the memory specified by the electronic apparatus includes a logical address indicating a start position of a storage area and a data length.

7. The storage device of claim 5, wherein:
the communication section receives data accompanied by additional data attached thereto from the external apparatus, and
the control section deletes the additional data from the data received by the communication section to extract data to be written into the memory and writes the data to be written in the specified range in the memory.

8. The storage device of any of claims 1 to 7, wherein the memory is a non-volatile memory which holds data even when the storage device is not coupled to the electronic apparatus.

9. The storage device of claim 1, wherein the control section writes an access inhibit cancellation flag in a predetermined flag register of the memory to cancel the inhibition of memory access placed on the electronic apparatus.

10. The storage device of claim 1, wherein the control section cancels the inhibition of memory access placed on the electronic apparatus when a transmission of the data read from the memory to the external apparatus in accordance with the transmission instruction is completed.

11. The storage device of claim 1, wherein the control section cancels the inhibition of memory access placed on the electronic apparatus when a writing into the memory of the data received from the external apparatus in accordance with the reception instruction is completed.

12. The storage device of claim 1, wherein, based on the access inhibit flag in the predetermined flag register of the memory, the control section determines whether the access to the memory is inhibited.

13. The storage device of claim 1, wherein the communication data from the external apparatus is temporarily stored in the memory.

14. A data communication system comprising:
a storage device configured to store data;
an electronic apparatus in which the storage device is removably mounted; and
an external apparatus capable of transmitting and receiving data, the external apparatus being separate from the electronic apparatus,
wherein,
the storage device includes (a) an input/output section configured to communicate with the electronic apparatus, (b) a memory for storing data, (c) a control section configured to access the memory based on an instruction from the electronic apparatus, the instruction being input to the input/output section, and (d) a communication section configured to communicate with the external apparatus that is separate from the electronic apparatus,
the instruction from the electronic apparatus includes an instruction that is a transmission instruction to transmit data from the memory to the external apparatus or a reception instruction to receive data into the memory from the external apparatus,
based on the transmission instruction from the electronic apparatus, the control section causes data to be read from the memory and transmitted from the communication section to the external apparatus,
based on the reception instruction from the electronic apparatus, the control section causes data to be received by the communication section from the external apparatus and written into the memory, and
(i) upon a receipt of the transmission instruction from the electronic apparatus, the control section responsively inhibits the electronic apparatus from accessing the memory for a period during which data is read from the memory and transmitted to the external apparatus in response to the transmission instruction from the electronic apparatus, and
(ii) upon a receipt of the reception instruction from the electronic apparatus, the control section responsively inhibits the electronic apparatus from accessing the memory for a period during which data is received from the external apparatus and written into the memory in response to the reception instruction from the electronic apparatus, and
when the communication section receives communication data from the external apparatus without first receiving the reception instruction from the electronic apparatus to receive data into the memory from the external apparatus, the control section (i) responsively saves the communication data in the memory and transmits a notice to the electronic apparatus that notifies the electronic apparatus of the reception of the communication data from the external apparatus, and (ii) thereafter causes the received communication data to be transmitted from the input/output section to the electronic apparatus in response to a memory readout instruction received from the electronic apparatus in response to the notice.

* * * * *